March 18, 1969 J. G. DRENNAN 3,433,523
APPARATUS FOR HANDLING BEVERAGE BOTTLES
Original Filed Sept. 2, 1965 Sheet 1 of 3

INVENTOR.
JAMES G. DRENNAN
BY
ATTORNEYS

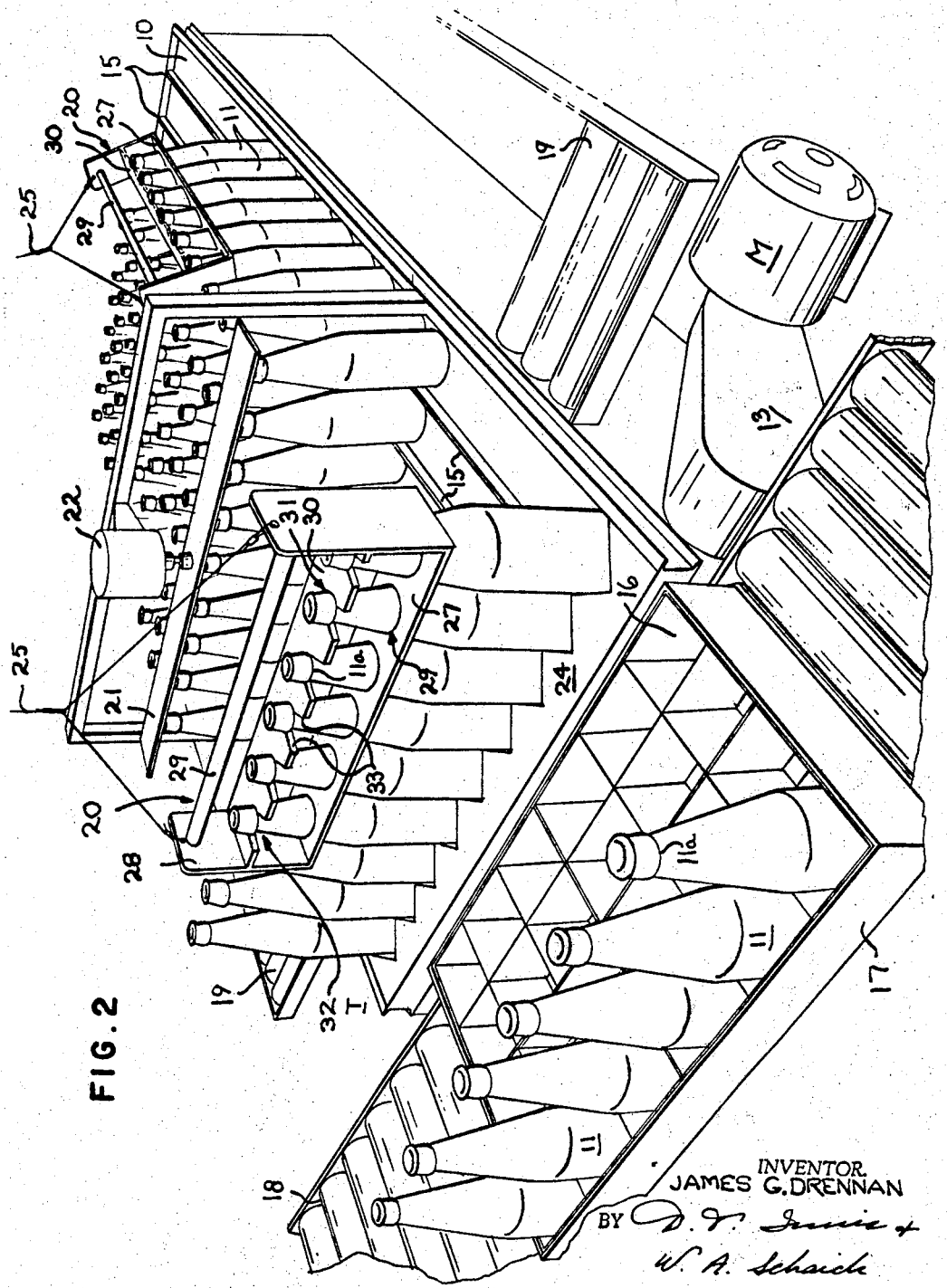

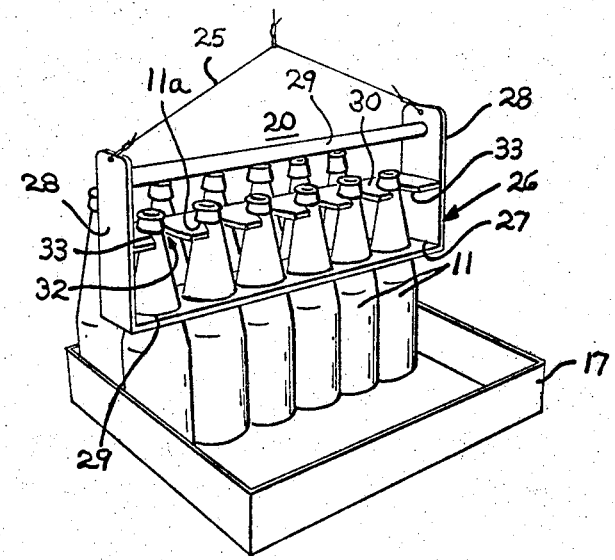
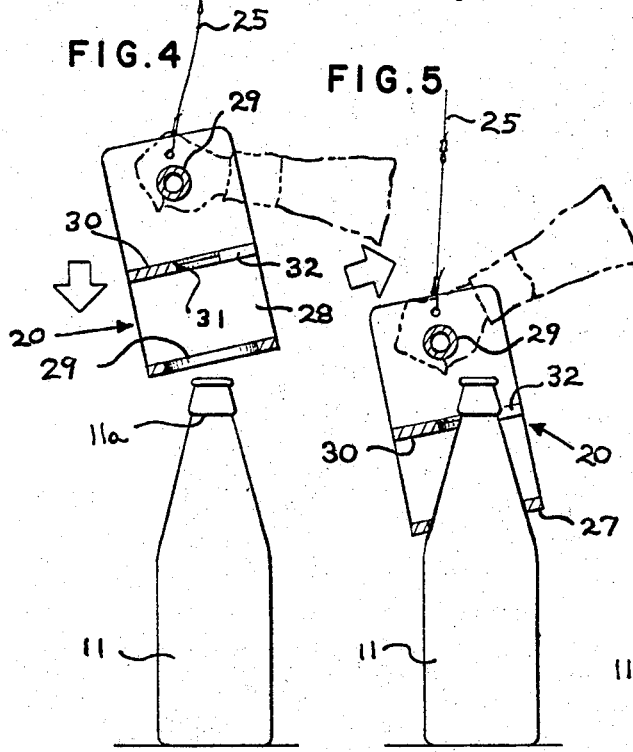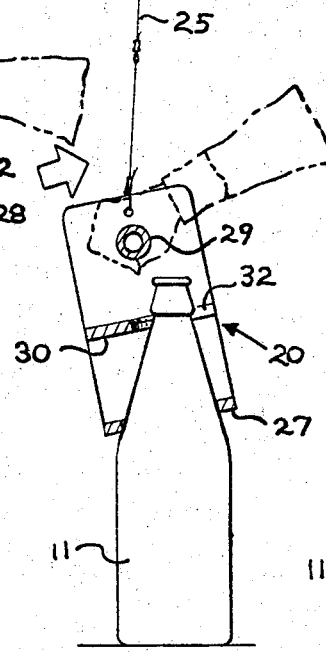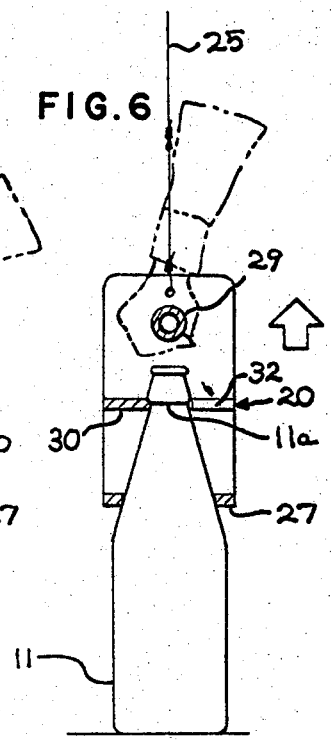

United States Patent Office 3,433,523
Patented Mar. 18, 1969

3,433,523
APPARATUS FOR HANDLING BEVERAGE BOTTLES
James G. Drennan, San Mateo, Calif., assignor to Owens-Illinois, Inc., a corporation of Ohio
Original application Sept. 2, 1965, Ser. No. 484,678. Divided and this application May 15, 1968, Ser. No. 729,177
U.S. Cl. 294—872　　　　　　　　　　　　　4 Claims
Int. Cl. B65 *71/00;* B66c *1/10*

ABSTRACT OF THE DISCLOSURE

A filled container transfer device wherein a plurality of filled containers are intermittently conveyed to a transfer location where they are picked up in groups of six and moved to a packing location, thus providing an arrangement wherein a six-pack of soft drink containers may be assembled with each of the six being of different color and/or flavor.

CROSS REFERENCE TO RELATED APPLICATION

This application is a division of application Ser. No. 484,678, filed Sept. 2, 1965, now Patent No. 3,397,504, issued Aug. 20, 1968.

BACKGROUND OF INVENTION

This invention relates to apparatus for handling beverage bottles and more particularly is concerned with packing assorted flavors and colors of bottled soft drinks in conventional trays or paperboard "take-home" carriers, or cartons, thereby to create novel merchandise having unusual esthetic appeal.

It has been the practice in the past, where it was desired to make up a pack of assorted soft drinks, to hand-select the various varieties of color and flavor and arrange the selection by hand. Hand-lifting of the containers with more than one or two in each hand is tiring and relatively time-consuming.

SUMMARY OF INVENTION

Apparatus for handling bottled beverages wherein, for example, bottles of six different flavors and colors of drinks are so positioned in individual lanes of a nine-lane horizontal conveyor that throught the use of a transfer apparatus or gripper six bottles at a time, each containing a different flavor beverage, may be removed from the conveyor and deposited in the cells of paperboard cartons, or cases.

BRIEF DESCRIPTION OF THE DRAWINGS

FIG. 2 is a fragmentary perspective view of the conveyor system showing also the bottle transferring means;

FIG. 3 is a detail perspective view of the bottle transferring apparatus; and

FIGS. 4, 5 and 6 are sectional elevational views illustrating the successive positions assumed by the transferring device in grasping a plurality of bottles.

Figure 1:
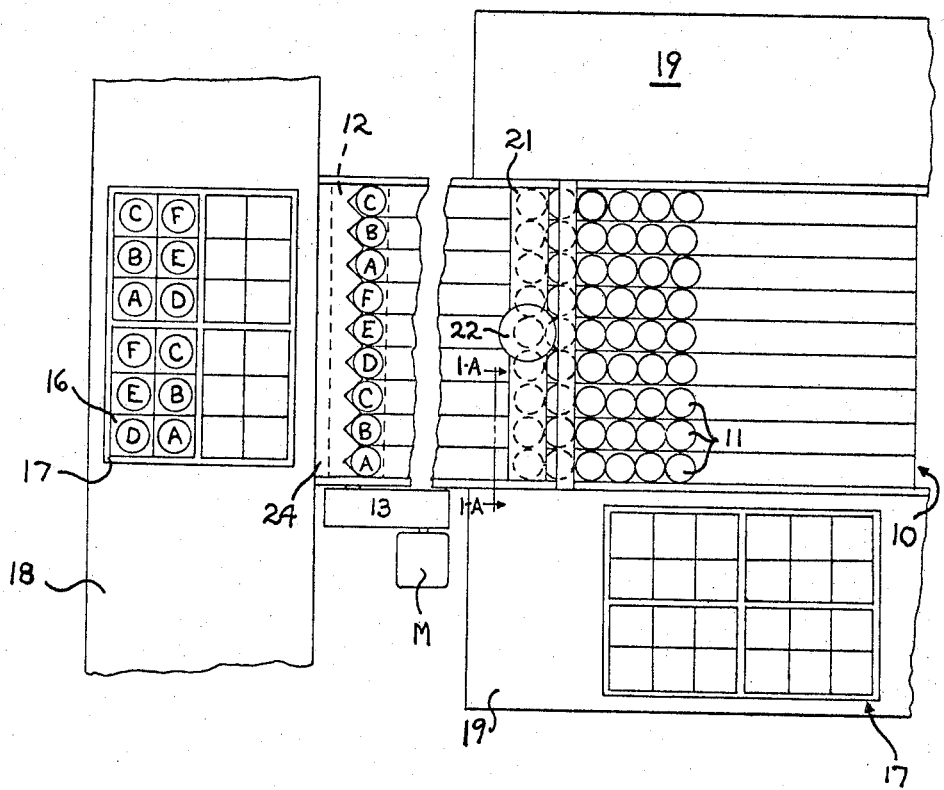
FIG. 1 is a fragmentary plan view of the conveyor system utilized in conjunction with the bottle transfer apparatus of the invention, certain superstructure being omitted.
Figure 1A:
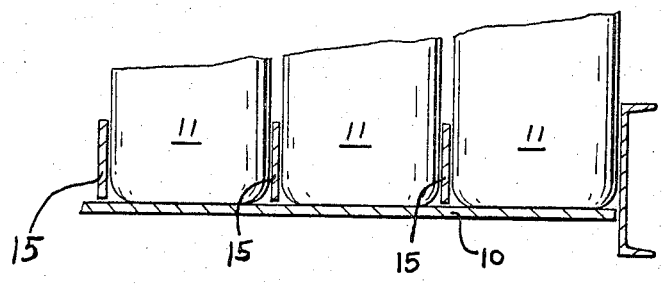
FIG. 1A is a sectional view taken on the line 1A—1A of FIG. 1.

In the preferred embodiment of my invention, a horizontal accumulator conveyor 10 of adequate length to maintain the required volume of filled beverage bottles 11 at the transfer station T, is trained over a driven horizontal roll 12 which receives its power from a motor M through conventional transmitting means (not shown) enclosed in the housing 13. This conveyor 10 supports the beverage bottles upright in nine parallel longitudinal rows or lanes such being defined by rails 15, or the like elements. In the outermost three lanes A, B and C near each side margin of the conveyor, three flavors and colors of bottled beverages will be positioned, viz, one flavor or color in each of the lanes A, another flavor and color in lanes B and a third flavor and color in lanes C. Thus, at each side of the conveyor will be three rows of bottles, each with a different flavor and color. The group of three lanes D, E and F lying between the previously mentioned two sets of lanes A, B and C will each accommodate three different flavors and colors of bottled beverages, these also differing from the flavors in lanes A, B and C. Thus, there will be a total of six flavors of beverages, so arranged across the nine lanes conveyor, that bottles in the three intermediate lanes D, E and F, together with bottles from either of the sets of lanes A, B and C will constitute a group of differently colored beverages ready for transfer to a row of six cells 16 of a tray 17, or if preferred to cells of two side-by-side paperboard bottle carriers (not shown). The trays 17 to which the filled capped bottles are transferred in groups or rows of six are supported, during loading or filling, on a skid 18, or perhaps a roller-type conveyor.

Along each side of the main conveyor 10 is a horizontal roller conveyor 19 functioning to support the trays 17 of filled beverage bottles which are transferred manually to the poper lanes, described above. An operator at each side of the main conveyor, well in advance of the transfer station T, through the use of a transfer device 20 or bottle gripper (FIGS. 3–6) removes groups of six bottles at a time from the trays and places them in the proper lane of the main conveyor 10. These trays, when empty, may be advanced to a point near the transfer station T where they can be placed on the skid 18 and be loaded with an assortment of flavors, in lieu of the single flavor which it contained while on the side roller conveyor. These trays may be replaced with conventional paperboard "take-home" bottle carriers (not shown) arranged on the skid in trays of the type illustrated so as to present rows of cells as in the tray arrangement.

As the rows of bottles advance, on the conveyor 10, their travel is interrupted by a rubber pad 21 which is carried by an air motor 22 suspended from the frame member 23. By means of any simple operator actuated control (not shown), this motor may be caused to raise and lower the pad. Thus, from the accumulated volume of bottles on the conveyor, a selected number may be released in properly timed fashion and allowed to move into contact with the stop bar 24. At this point another of the transfer devices 20, or bottle grippers, picks up six of the bottles at one end or the other of the transverse row of nine and under guidance of an operator deposits them in the carton or tray cells 16. Owing to the weight of the groups of bottles being handled, I prefer utilizing a counterweight (not shown) which in obvious fashion may be secured to an end of the cable 25, shown rising from each gripper 20 with the cable passing over an overhead pulley.

As best shown in FIGS. 3–6, each of these grippers 20, or bottle transfer devices, comprises an elongated U-shape frame 26, including an elongated flat base 27 and at each end an upright arm 28, the upper extremities of which are interconnected by a handle forming rod 29. The aforementioned cable 25 is connected to the upper end of these arms 28. The base 27 is formed with a row of six equidistantly spaced apart vertical openings 29, each preferably of a diameter slightly less than the main body diameter of the bottles being handled. Thus, the walls of these openings come to rest upon the tapered shoulder area of the bottles near its juncture with the body proper, when the device is in supporting engagement with a group of bottles. Just above the base 27 is a bottle finish engaging jaw member 30. This is a flat, longitudinal bar parallel with the base 27 and secured at its ends to the aforementioned upright arms 28. Centrally of this jaw member 30 is a series of generally circular apertures 31 coaxial with the openings 29 in the base 27. The walls of these openings are intended to engage the lower side of the transfer bead 11a of the bottles and thus support them in the gripper 20. Inlet and exit slots or guides 32 lead to these apertures 31, such opening through one margin of the jaw member 30. These guides 32 have inwardly converging curved side walls 33 facilitating entry of the bottle necks into the jaw creating apertures 31.

In view of the foregoing, it is believed evident that in practicing my method and using equipment as illustrated herein, a six-pack "take-home" paperboard carrier, for example, may be filled quite readily with six different colors and flavors of bottled beverages, thus creating a package having exceptional esthetic appeal to the consumer. To this end the operator merely first lifts six bottles from one end of the lead transverse row at the stop 24, places them in the cells of two side-by-side paperboard carriers, allows additional bottles to advance, replacing those just transferred and then lifts six bottles from the other end of the lead row. Thus, it is seen that each loaded carrier will contain bottles of beverage of six different flavors and colors.

Modifications may be resorted to within the spirit and scope of the appended claims.

I claim:
1. A beverage bottle transfer device for transferring a plurality of bottles having tapered necks and a transfer bead near the upper end of the necks, said device comprising an elongated, flat base portion formed with a longitudinal series of vertical openings of approximately the diameter of a selected portion of the bottle necks, overlying handle means connected to said base portion, a jaw member positioned between said base portion and handle means comprising a bar having neck accommodating apertures coaxial with and individual to said openings and there being entrances to the apertures from one margin of said bar, the walls of the apertures adapted for supporting engagement with the transfer beads of the bottles.

2. In a device as defined in claim 1, wherein said entrances to said apertures comprise slots having side walls converging toward the apertures.

3. In a device as defined in claim 1, wherein said handle means is connected to said base portion by a pair of upright arms connected to the ends of the base portion and said handle means extends between the upper ends of said arms.

4. In a device as defined in claim 3, wherein said handle means comprises a horizontal rod.

References Cited
UNITED STATES PATENTS

| | | | |
|---|---|---|---|
| 2,865,669 | 12/1959 | Linthicum | 294—87.2 |
| 2,996,329 | 8/1961 | Glazer | 294—87.2 |

EVON C. BLUNK, *Primary Examiner.*

HARVEY C. HORNSBY, *Assistant Examiner.*

U.S. Cl. X.R.

224—45